(12) United States Patent
Minami et al.

(10) Patent No.: US 10,177,403 B2
(45) Date of Patent: Jan. 8, 2019

(54) NEGATIVE-ELECTRODE ACTIVE MATERIAL FOR NON-AQUEOUS ELECTROLYTE SECONDARY BATTERY, NEGATIVE ELECTRODE FOR NON-AQUEOUS ELECTROLYTE SECONDARY BATTERY, AND NON-AQUEOUS ELECTROLYTE SECONDARY BATTERY

(71) Applicant: Sanyo Electric Co., Ltd., Daito-shi, Osaka (JP)

(72) Inventors: Hiroshi Minami, Hyogo (JP); Taizou Sunano, Tokushima (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/526,011

(22) PCT Filed: Feb. 15, 2016

(86) PCT No.: PCT/JP2016/000758
§ 371 (c)(1),
(2) Date: May 11, 2017

(87) PCT Pub. No.: WO2016/136180
PCT Pub. Date: Sep. 1, 2016

(65) Prior Publication Data
US 2017/0309950 A1    Oct. 26, 2017

(30) Foreign Application Priority Data

Feb. 23, 2015  (JP) .................................. 2015-033003

(51) Int. Cl.
*H01M 4/36* (2006.01)
*H01M 4/40* (2006.01)
(Continued)

(52) U.S. Cl.
CPC ........... *H01M 10/052* (2013.01); *C01B 33/32* (2013.01); *H01M 4/364* (2013.01); *H01M 4/38* (2013.01);
(Continued)

(58) Field of Classification Search
CPC .... H01M 10/052; H01M 4/364; H01M 4/405; H01M 4/48; H01M 2004/027
See application file for complete search history.

(56) References Cited

U.S. PATENT DOCUMENTS

| | | | |
|---|---|---|---|
| 2003/0053945 A1 | 3/2003 | Fukuoka et al. | |
| 2016/0087267 A1* | 3/2016 | Yoshio | H01M 10/052 429/231.95 |
| 2016/0102010 A1* | 4/2016 | Beall | C03B 32/02 428/410 |

FOREIGN PATENT DOCUMENTS

| | | |
|---|---|---|
| JP | 2003-160328 A | 6/2003 |
| JP | 2007-59213 A | 3/2007 |

(Continued)

OTHER PUBLICATIONS

International Search Report dated May 17, 2016, issued in counterpart of International Application No. PCT/JP2016/000758 (2 pages).

*Primary Examiner* — Brittany L Raymond
(74) *Attorney, Agent, or Firm* — Westerman, Hattori, Daniels & Adrian, LLP (57) ABSTRACT

A non-aqueous electrolyte secondary battery that contains a silicon material as a negative-electrode active material has improved cycle life. A negative-electrode active material particle (10) according to an embodiment includes a lithium silicate phase (11) represented by $Li_{2z}SiO_{(2+z)}$ {0<z<2}, silicon particles (12) dispersed in the lithium silicate phase (11), and a metallic compound (15) (other than lithium compounds and silicon oxides) dispersed in the lithium (Continued)

silicate phase (11). The metallic compound (15) is preferably selected from zirconium oxide, aluminum oxide, zirconium carbide, tungsten carbide, and silicon carbide.

19 Claims, 1 Drawing Sheet

(51) Int. Cl.
  *H01M 4/48* (2010.01)
  *H01M 10/052* (2010.01)
  *H01M 4/38* (2006.01)
  *C01B 33/32* (2006.01)
  *H01M 4/485* (2010.01)
  *H01M 4/02* (2006.01)

(52) U.S. Cl.
  CPC ............ *H01M 4/405* (2013.01); *H01M 4/48* (2013.01); *H01M 4/485* (2013.01); *H01M 2004/027* (2013.01)

(56) References Cited

FOREIGN PATENT DOCUMENTS

| | | |
|---|---|---|
| JP | 2011-233245 A | 11/2011 |
| JP | 2013-161705 A | 8/2013 |
| JP | 2013-234088 A | 11/2013 |
| JP | 2014-107013 A | 6/2014 |
| JP | 2014-199753 A | 10/2014 |
| JP | 2014-220216 A | 11/2014 |

\* cited by examiner

FIG. 1

NEGATIVE-ELECTRODE ACTIVE MATERIAL FOR NON-AQUEOUS ELECTROLYTE SECONDARY BATTERY, NEGATIVE ELECTRODE FOR NON-AQUEOUS ELECTROLYTE SECONDARY BATTERY, AND NON-AQUEOUS ELECTROLYTE SECONDARY BATTERY

TECHNICAL FIELD

The present disclosure relates to a negative-electrode active material for a non-aqueous electrolyte secondary battery, a negative electrode for a non-aqueous electrolyte secondary battery, and a non-aqueous electrolyte secondary battery.

BACKGROUND ART

It is known that more lithium ions per unit volume can be intercalated into silicon materials, such as silicon (Si) and silicon oxides represented by $SiO_x$, than into carbon materials, such as graphite. In particular, the volume change due to the intercalation of lithium ions is smaller in $SiO_x$ than in Si, and application of $SiO_x$ to a negative electrode of lithium-ion batteries has been investigated. For example, Patent Literature 1 discloses a non-aqueous electrolyte secondary battery that contains a mixture of $SiO_x$ and graphite as a negative-electrode active material.

However, non-aqueous electrolyte secondary batteries that contain $SiO_x$ as a negative-electrode active, material have lower initial charge/discharge efficiency than non-aqueous electrolyte secondary batteries that contain graphite as a negative-electrode active material. This is mainly because an electrochemical reaction during charging produces an irreversible compound, such as $Li_4SiO_4$, and produces irreversible capacity. Patent Literature 2 proposes a negative-electrode active material represented by $SiLi_xO_y$, ($0<x<1.0$, $0<y<1.5$) containing a Li silicate in order to reduce such irreversible capacity. Patent Literature 3 proposes a negative electrode material containing a combination of a $Si/SiO_2/Li_4SiO_4$ three-phase composite structure oxide and carbon.

CITATION LIST

Patent Literature

PTL 1: Japanese Published Unexamined Patent Application No. 2011-233245
PTL 2: Japanese Published Unexamined Patent Application No. 2003-160328
PTL 3: Japanese Published Unexamined Patent Application No. 2007-59213

SUMMARY OF INVENTION

Technical Problem

The volume change of $SiO_x$ due to the intercalation of lithium ions is smaller than, that of Si but is greater than that of carbon materials, such as graphite. Thus, charging and discharging causes a crack in the matrix of active material particles around silicon particles. Such a crack in particles impairs the current collecting performance of the negative electrode, and a newly exposed surface in the particles reacts with an electrolyte solution, increases the amount of irreversible component, and causes deterioration of cycle characteristics. It is an object of the present disclosure to improve the cycle characteristics of a non-aqueous electrolyte secondary battery that contains a silicon material as a negative-electrode active material.

Solution to Problem

A negative-electrode active material for a non-aqueous electrolyte secondary battery according to one aspect of the present disclosure includes a lithium silicate phase represented by $Li_{2z}SiO_{(2+z)}$ $\{0<z<2\}$, silicon particles dispersed in the lithium silicate phase, and a metallic compound (other than lithium compounds and silicon oxides) dispersed in the lithium silicate phase.

Advantageous Effects of Invention

One aspect of the present disclosure can improve the cycle characteristics of a non-aqueous electrolyte secondary battery that contains a silicon material as a negative-electrode active material.

DESCRIPTION OF EMBODIMENTS

A negative-electrode active material according to the present disclosure includes a lithium silicate phase represented by $Li_{2z}SiO_{(2+z)}$ ($0<z<2$) and silicon particles (Si particles) dispersed in the lithium silicate phase, The negative-electrode active material further includes a metallic compound dispersed in the lithium silicate phase. A negative-electrode active material according to the present disclosure may contain $SiO_2$ mostly in the form of a natural oxidation film on the surface of the Si particles. $SiO_2$ in the form of a natural oxidation film is very different in characteristics from $SiO_2$ contained in known $SiO_x$ particles. For example, no $SiO_2$ peak is observed at $2\theta=25$ degrees in an XRD pattern obtained by XRD measurement of a negative-electrode active material according to the present disclosure. This is probably because the natural oxidation film is very thin and cannot diffract X-rays. By contrast, a $SiO_2$ peak is observed at $2\theta=25$ degrees in an XRD pattern of known $SiO_x$ particles (for example, $SiO_x$ disclosed in Patent Literature 1).

In $SiO_x$ disclosed in Patent Literature 1, $SiO_2$ forms a matrix. The matrix refers to a phase around Si particles that are involved in a charge/discharge reaction. In the charging process, $SiO_x$ undergoes an alloying reaction with $Li^+$ according to the following chemical formula. The matrix $SiO_2$ forms a silicate with $Li^+$ and produces irreversible capacity.

$$Si + 4.4Li^+ + 4.4e^- \rightarrow Li_{4.4}Si \qquad (1)$$

$$SiO_2 + 4Li^+ \rightarrow Li_4SiO_4 \qquad (2)$$

A negative-electrode active material according to the present disclosure contains Si particles dispersed in a lithium silicate phase represented by $Li_{2z}SiO_{(2+z)}$ ($0<z<2$) and has a much lower $SiO_2$ content than known $SiO_x$, for example. $SiO_2$ in a negative-electrode active material according to the present disclosure is a natural oxidation film and is very different in characteristics from $SiO_2$ contained in known SiO$_x$ particles. Thus, in a non-aqueous electrolyte secondary battery containing a negative-electrode active material according to the present disclosure, the reaction represented by the formula (2) is less likely to occur, and the irreversible capacity can be reduced.

The volume of Li$_{4.4}$Si produced by a charging reaction increases to 400% the volume of Si and decreases to the initial volume through the discharging process. In this case, stress is generated outside Si particles and stay deform or destroy the matrix around the Si particles and cause cracks in active material particles. In a charge/discharge cycle test, repeated expansion and contraction causes cracks in active material particles, impairs the current collecting performance of the negative electrode, and reduces battery capacity. The related art focuses mostly on the composition of the matrix around Si particles, and improvement in the durability of the matrix has not been sufficiently studied.

The present inventors have performed extensive studies on strengthening the matrix of a lithium silicate phase to thereby suppress cracking of active material particles due to expansion and contraction of Si particles and to improve the cycle characteristics of the battery. The present inventors have successfully produced active material particles in which a metallic compound, such as zirconium oxide, dispersed in a lithium silicate phase suppresses cracking of the particles. The metallic compound functions as a filler, to reinforce the lithium silicate phase, increase the contact area of a solid-solid interface of a lithium silicate, and suppress cracking of active material particles. In a negative-electrode active material according to the present disclosure, stress applied to a lithium silicate phase due to expansion and contraction of Si particles can be relieved, strain can be dispersed, and deterioration of current collecting performance due to cracking of active material particles is suppressed. Thus, a battery containing a negative-electrode active material according to the present disclosure has good cycle characteristics.

Embodiments of the present invention will be described in detail below.

The drawings referred to in the embodiments are schematically illustrated, and the dimensions of constituents in the drawings may foe different from the actual dimensions of the constituents. Specific dimensions should be determined in consideration of the following description.

A non-aqueous electrolyte secondary battery according to an embodiment includes a negative electrode, containing the negative-electrode active, material, at positive, electrode, and a non-aqueous electrolyte containing a non-aqueous, solvent. Preferably, a separator is disposed between the positive electrode and the negative electrode. A non-aqueous electrolyte secondary battery according to an embodiment includes an electrode assembly and a non-aqueous electrolyte in a housing. The electrode assembly includes a roll of a positive electrode and a negative electrode with a separator interposed therebetween. Alternatively, another electrode assembly, such as a layered electrode assembly, may be used instead of the wound electrode assembly. The layered electrode assembly includes a positive electrode and a negative electrode stacked with a separator interposed therebetween. A battery case for housing an electrode assembly and a non-aqueous electrolyte may be a cylindrical, square or rectangular, coin-shaped, or button-shaped metallic case, or a resin case formed of laminated resin sheets (laminated battery).

[Positive Electrode]

The positive electrode includes a positive-electrode current collector, for example, formed of metal foil, and a positive-electrode mixture layer disposed on the current collector. The positive-electrode current collector can be formed of foil of a metal stable in the electric potential range of the positive electrode, such as aluminum, or a film having a surface; layer formed of the metal. The positive-electrode mixture layer preferably contains an electrically conductive agent and a binder as well as a positive-electrode active material. For example, the positive electrode can foe formed by applying a positive-electrode mixture slurry containing a positive-electrode active material, an electrically conductive agent, and a binder to a positive-electrode current collector, drying the slurry, and rolling the dried slurry to form a positive-electrode mixture layer on both sides of the current collector.

The positive-electrode active material may be a layered lithium composite oxide containing Li and a metal element M, or an olivine lithium phosphate exemplified by lithium iron phosphate. The metal element M may be a transition metal element, such as Co, Ni, or Mn. The positive-electrode active material is preferably a lithium transition, metal oxide. The lithium transition metal oxide; may contain, a metal element M other than transition metals. Examples of the metal element M include Mg, Sc, Y, Fe, Cu, Zn, Al, Cr, Pb, Sb, and B, as well as Co, Ni, and Mn. A preferred lithium transition metal oxide may be a Ni—Co—Mn, Mi—Mn—Al, or Ni—Co—Al composite oxide. These may be used alone or in combination. The particles of the positive-electrode active material may be covered with, fine particles of an oxide, such as aluminum oxide (Al$_2$O$_3$), or of an inorganic compound, such as a phosphoric acid compound or a boric acid compound.

The electrically conductive agent is used to increase the electrical conductivity of the positive-electrode mixture layer. The electrically conductive agent may be a carbon material, such as carbon black, acetylene black, ketjen black, or graphite. These may be used alone or in combination.

The binder is used to maintain good contact between the positive-electrode active material and the electrically conductive agent and improve the binding property of the positive-electrode active material on the surface of the positive-electrode current collector. The binder may be a fluoropolymer, such as polytetrafluoroethylene (PTFE) or poly(vinylidene fluoride) (PVdF), polyacrylonitrile (PAN), polyimide resin, acrylic resin, or polyolefin resin. These resins may be used in combination with carboxymethylcellulose (CMC) or a salt thereof (such as CMC-Na, CMC-K, or CMC-NH4, or a partially neutralized salt thereof) or poly(ethylene oxide) (PEO). These may be used alone or in combination.

[Negative Electrode]

Preferably, the negative electrode includes a negative-electrode current collector, for example, formed of metal foil, and a negative-electrode mixture layer disposed on the current collector. The negative-electrode current collector can be formed of foil of a metal stable in the electric potential range of the negative electrode, such as copper, or a film having a surface layer formed of the metal. The negative-electrode mixture layer preferably contains a binder as well as a negative-electrode active material. For example, the negative electrode can be formed by applying a negative-electrode mixture slurry containing a negative-electrode active material and a binder to a negative-electrode current collector, drying the slurry, and rolling the dried slurry to form a negative-electrode mixture layer on both sides of the current collector.

As in the positive electrode, the binder can foe a fluoropolymer, PAN, polyimide resin, acrylic resin, or polyolefin resin. In the preparation of a mixture slurry with an aqueous solvent, preferably used is CMC or a salt thereof (such as CMC-Na, CMC-K, or CMC-NH$_4$, or a partially neutralized salt thereof), styrene-butadiene rubber (SBR), poly(acrylic acid) (PAA) or a salt thereof (such as PAA-Na or PAA-K, or a partially neutralized salt thereof), or poly(vinyl alcohol) (PVA).

Figure 1:
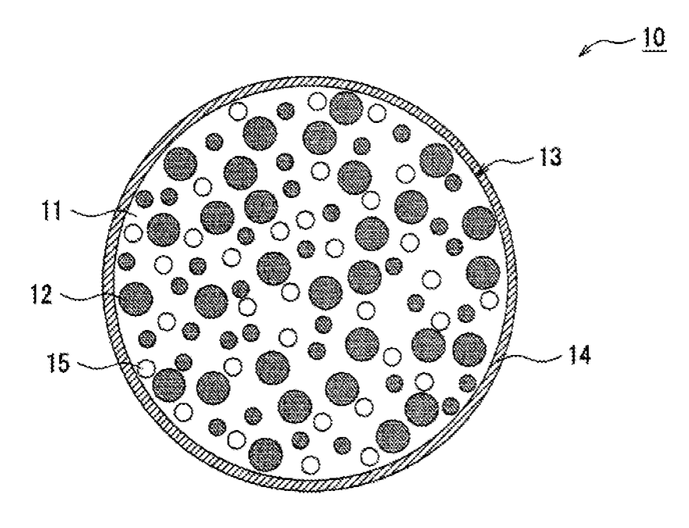
FIG. 1 is a schematic cross-sectional view of a negative-electrode active material according to an embodiment.

FIG. 1 is a cross-sectional view of a negative-electrode active material particle 10 according to an embodiment.

As illustrated in FIG. 1, the negative-electrode active material particle 10 includes a lithium silicate phase 11, silicon particles 12 dispersed in the lithium silicate phase 11, and a metallic compound 15 dispersed in the lithium silicate phase 11. SiO$_2$ in the negative-electrode active material particle 10 is mostly in the form of a natural oxidation film. Preferably, no SiO$_2$ peak is observed at 2θ=25 degrees in an XRD pattern obtained by XRD measurement of the negative-electrode active material particle 10. A base particle 13 composed of the lithium silicate phase 11, the silicon particles 12, and the metallic compound 15 is preferably covered with an electrically conductive layer 14.

The base particle 13 may contain a third component other than the lithium silicate phase 11, the silicon particles 12, and the metallic compound 15. The amount of SiO$_2$, if any, in the form of a natural oxidation film contained in the base particle 13 is preferably less than 10% by mass, more preferably less than 7% by mass. A smaller size of the silicon particles 12 results in a larger surface area of the silicon particles 12 and more Si$_2$ in the form of a natural oxidation film.

More lithium ions can be intercalated into the silicon particles 12 of the negative-electrode active material particle 10 than into carbon materials, such as graphite. Thus, use of the negative-electrode active material particles 10 in the negative-electrode active material can contribute to increased capacity of the battery. The negative-electrode mixture layer may contain the negative-electrode active material particles 10 alone as a negative-electrode active material. However, since the volume change due to charging and discharging is greater in the silicon material than in graphite, another active material that suffers a smaller volume change due to charging and discharging may also be used to increase capacity while maintaining good cycle characteristics. The other active material is preferably a carbonaceous negative-electrode active material, such as graphite.

The graphite may be graphite conventionally used as a negative-electrode active material, for example, natural graphite, such as flake graphite, bulk graphite, or earthy graphite, or artificial graphite, such as massive artificial graphite (MAG) or graphitized mesophase carbon, microbeads (MCMB). When a carbonaceous negative-electrode active material (for example, graphite) is also used, the carbonaceous negative-electrode active material content preferably ranges from 70% to 95% by mass. As long as the carbonaceous negative-electrode active material content is in this range, it becomes easier to achieve both higher-capacity and improved cycle characteristics.

The lithium silicate phase 11 is formed of a lithium silicate represented by Li$_{2z}$SiO$_{(2+z)}$ (0<z<2). In other words, Li$_4$SiO$_4$ (Z=2) does not constitute the lithium silicate phase 11. Li$_4$SiO$_4$ is an unstable compound, reacts with water and becomes alkaline, and thereby modifies Si and reduces charge/discharge capacity. The lithium silicate phase 11 is preferably composed mainly of Li$_2$SiO$_3$ (Z =1) or Li$_2$Si$_2$O$_5$ (Z=½) in terms of stability, manufacturability, and lithium ion conductivity. When Li$_2$SiO$_3$ or Li$_2$Si$_2$O$_5$ is a main component (a component with the largest mass), the main component content is preferably 50% or more by mass, more preferably 80% or more by mass, of the total mass of the lithium silicate phase 11.

The lithium silicate phase 11 is preferably composed of fine particles. For example, the lithium silicate phase 11 is composed of particles finer than the silicon, particles 12, In an XRD pattern of the negative-electrode active, material, particle 10, for example, the (111) peak intensity of Si is higher than the (111) peak intensity of a lithium silicate.

The negative-electrode active material particles 10 after charging and discharging preferably contain no Li$_4$SiO$_4$. Since SiO$_2$ in the starting material of the negative-electrode active material particles 10 is mostly in the form of a natural oxidation film, the reaction represented by the formula (3) is less likely to occur in initial charging and discharging, and the irreversible reactant Li$_4$SiO$_4$ is negligibly formed.

Preferably, the silicon particles 12 are almost uniformly dispersed in the lithium silicate phase 11. For example, the negative-electrode active material particle 10 (the base particle 13) has a sea-island structure in which fine silicon particles 12 are dispersed in a lithium silicate matrix, and the silicon particles 12 are not localized in a particular region and are almost uniformly distributed in any cross section of the negative-electrode active material particle 10 (the base particle 13). The amount of the silicon particles 12 (Si) in the base particle 13 preferably ranges from 20.% by mass to 95% by mass, more preferably 35% by mass to 75% by mass, of the total mass of the base particle 13 in terms of higher capacity and improved cycle characteristics. An excessively low Si content may result in decreased charge/discharge capacity and poor load characteristics due to insufficient diffusion of lithium ions. An excessively high Si content may cause deterioration of cycle characteristics because part of Si is not covered with a lithium silicate, and exposed Si comes into contact with an electrolyte solution.

The silicon particles 12 may have an average particle size of 500 nm or less, preferably 200 nm or less, more preferably 50 nm or less, before initial charging. After initial charging, 400 nm or less is preferred, and 100 nm or less is more preferred. A decrease in the size of the silicon particles 12 results in a smaller volume change during charging and discharging and makes it easier to suppress cracking of active material particles. The average particle size of the silicon particles 12 is determined by observing a cross section of the negative-electrode active material particle 10 with a scanning electron microscope (SEM) or a transmission electron microscope (TEM). More specifically, the average particle size of the silicon particles 12 is determined by converting each area of 100 of the silicon particles 12 into an equivalent circle, diameter and averaging the equivalent circle diameters.

The metallic compound 15 may be a metal oxide, metal carbide, metal nitride, or metal boride, other than lithium compounds and silicon oxide (SiO$_2$). The metallic compound 15 is preferably a metal oxide or metal carbide. Among them, at least one selected from zirconium oxide (ZrO$_2$), aluminum oxide (Al$_2$O$_3$), zirconium carbide (ZrC), tungsten carbide (WC), and silicon carbide (SiC) is preferably used. The metallic compound 15 functions to disperse and reduce stress applied to the lithium silicate phase 11 due to expansion and contraction of the silicon particles 12 and to suppress cracking of active material particles.

In order to improve cycle characteristics, the metallic compound 15 is more preferably composed mainly of ZrO$_2$ or Al$_2$O$_3$ and is particularly preferably composed mainly of ZrO$_2$. When the metallic compound 15 is composed mainly of $ZrO_2$, the $ZrO_2$ content is preferably 50% or more by mass, particularly preferably 70% or more by mass, of the total mass of the metallic compound 15. The metallic compound 15 may be composed of $ZrO_2$ alone (approximately 100% by mass).

Like the silicon particles 12, the metallic compound 15 is preferably almost uniformly dispersed in the lithium silicate phase 11. For example, the base particle 13 has a sea-island structure in which the metallic compound 15 is finely dispersed in a lithium silicate matrix, and the metallic compound 15 in any cross section is almost uniformly dispersed without unevenly dispersed in a particular region. The amount of the metallic compound 15 ranges from 0.005% to 15% by mass, for example, and preferably ranges from 0.01% to 10% by mass, particularly preferably 0.01% to 1% by mass, of the mass of the lithium silicate phase 11 and the silicon particles 12 of the base particle 13. As long as the amount of the metallic compound 15 is in this range, the metallic compound 15 can improve the cycle life of the battery without greatly affecting specific capacity.

The metallic compound 15 preferably has an average particle size of 200 nm or less, particularly preferably 100 nm or less. As long as the metallic compound 15 has a particle size in this range, it is easy to uniformly disperse the metallic compound 15 in the lithium silicate phase 11. In the same manner as in the silicon particles 12, the average particle size of the metallic compound 15 is determined, by observing a cross section of the negative-electrode active material particle 10 with a SEM or TEM. More specifically, the average particle size of the metallic compound 15 is determined by converting each area of 100 of the metallic compound 15 into an equivalent circle, diameter and averaging the equivalent circle diameters.

The negative-electrode active material particles 10 preferably have an average particle size in the range of 1 to 15 μm, more preferably 4 to 10 μm, in terms of higher capacity and improved cycle characteristics. The average particle size of the negative-electrode active material particles 10 is the size of primary particles and refers to the particle size at which the integrated volume is 50% in the particle size distribution measured by a laser diffraction scattering method (for example, with LA-750 manufactured by Horiba, Ltd.) (the volume-average particle size). When the negative-electrode active material particles 10 have an excessively small average particle size, this tends to result in decreased capacity due to an increased surface area and an enhanced reaction with an electrolyte. On the other hand, when the negative-electrode active material particles 10 have an excessively large average particle size, this tends to result in an increased volume change due to charging and discharging and the deterioration of cycle characteristics. Although the negative-electrode active material particle 10 (the base particle 13) is preferably covered with, the electrically conductive layer 14, the electrically conductive layer 14 has a small thickness and has little effect on the average particle size of the negative-electrode active material particle 10 (the particle size of the negative-electrode active material particle 10 is almost equal to the particle size of the base particle 13).

The base particles 13 can be manufactured through the following steps 1 to 3, for example.

(1) A ground Si powder, a ground lithium silicate powder, and a ground metallic compound powder, such as $ZrO_2$, each having an average particle size in the range of several to tens of micrometers are mixed at a predetermined mass ratio to prepare a mixture.

(2) The mixture is then ground in a ball mill for micronization. Alternatively, their raw powders subjected to micronization in advance may be used to prepare the mixture.

(3) The ground mixture is heat-treated in an inert atmosphere at a temperature in the range of 600° C. to 1000° C., for example. In the heat treatment, the mixture may be pressed, for example, by hot pressing to form a sintered body. Lithium silicates represented by $Li_{2z}SiO_{(2+z)}$ ($0<z<2$) are stable in this temperature range and do not react with Si. Thus, the capacity is not decreased. Alternatively, 31 nanoparticles and lithium silicate nanoparticles may be synthesized without a ball mill and may be mixed and heat-treated to prepare the base particles 13.

The negative-electrode active material particle 10 preferably includes the electrically conductive layer 14 on its surface. The electrically conductive layer 14 is formed of a material having higher electrical conductivity than the lithium silicate phase 11 surrounding the silicon particles 12 and the metallic compound 15. The electrically conductive agent of the electrically conductive layer 14 is preferably electrochemically stable and is preferably at least one selected front carbon materials, metals, and metallic compounds. As in the electrically conductive agent in the positive-electrode mixture layer, the carbon materials may be carbon black, acetylene black, ketjen black, graphite, and a mixture of at least two of these materials. The metals may be copper, nickel, and alloys thereof that are stable in the electric potential range of the negative electrode. The metallic compounds may foe copper compounds and nickel compounds (a metal or metallic compound layer can be formed on the base particle 13, for example, by electroless plating). Among these, the carbon materials are particularly preferred.

A method for covering the base particles 13 with carbon may be a GVD method using acetylene and/or methane, or a method of mixing coal pitch, petroleum pitch, and/or a phenolic resin with the base particles 13 and heat-treating the mixture. Alternatively, carbon black and/or ketjen black may be adhered to the base particles 13 with a binder to form a carbon covering layer.

The electrically conductive layer 14 preferably almost entirely covers the base particle 13. The electrically conductive layer 14 preferably has a thickness in the range of 1 to 200 nm, more preferably 5 to 100 nm, in terms of electrical conductivity and the diffusion of lithium ions in the base particle 13. The electrically conductive layer 14 having an excessively small thickness has lower electrical conductivity and has difficulty in uniformly covering the base particle 13. On the other hand, the electrically conductive layer 14 having an excessively large thickness tends to prevent the diffusion of lithium ions into the base particle 13 and decrease capacity. The thickness of the electrically conductive layer 14 can be determined by the cross-sectional observation of particles with SEM or TEM.

[Separator]

The separator may be an ion-permeable insulating porous sheet. Specific examples of the porous sheet include microporous thin films, woven fabrics, and nonwoven fabrics. The material of the separator is preferably an olefin resin, such as polyethylene or polypropylene, or cellulose. The separator may be a laminate of a cellulose fiber layer and a thermoplastic fiber layer, such as an olefin resin. The separator may be a multilayer separator including a polyethylene layer and a polypropylene layer or a separator coated with an aramid resin.

A filler layer containing an inorganic filler may be disposed at an interface between the separator and at least one of the positive electrode and the negative electrode. Examples of the inorganic filler include oxides containing at least one of titanium (Ti), aluminum (Al), silicon (Si), and magnesium (Mg), and phosphoric acid compounds. The filler layer may be formed by applying a slurry containing the filler to the positive electrode, the negative electrode, or the separator.

[Non-Aqueous Electrolyte]

The non-aqueous electrolyte contains a non-aqueous solvent and an electrolyte salt dissolved in the non-aqueous solvent. The non-aqueous electrolyte is not limited to a liquid electrolyte (non-aqueous electrolytic solution) and may be a solid electrolyte containing a gel polymer. The non-aqueous, solvent may be an ester, ether, nitrile, such as acetonitrile, amide, such as dimethylformamide, or a mixed solvent of at least two of these solvents. The non-aqueous solvent may contain a halogen substitution product of these solvents, in which at least part of hydrogens of the solvents are substituted with a halogen atom, such as fluorine.

Examples of the ester include cyclic carbonates, such as ethylene carbonate (EC), propylene carbonate (PC), and butylene carbonate, chain carbonates, such as dimethyl carbonate (DMC), methyl ethyl carbonate (EMC), diethyl carbonate (DEC), methyl propyl carbonate, ethyl propyl carbonate, and methyl isopropyl carbonate, cyclic carboxylates, such as γ-butyrolactone (GBL) and γ-valerolactone (GVL), and chain carboxylates, such as methyl acetate, ethyl acetate, propyl acetate, methyl propionate (MP), and ethyl propionate.

Examples of the ether include cyclic ethers, such as 1,3-dioxolane, 4-methyl-1,3-dioxolahe, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethosyfoenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

The halogen substitution product is preferably a fluorinated cyclic carbonate, such as fluoroethylene carbonate (EEC), a fluorinated chain carbonate, or a fluorinated chain carboxylate, such as fluoropropionic acid methyl (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{3-x}(C_nF_{2n+1})_x$ (1<x<6, n is 1 or 2), $LiB_{10}Cl_{10}$, LiCl, LiBr, LiI, chloroborane lithium, lower aliphatic carboxylic acid lithium, borates, such as $Li_2B_4O_7$ and $Li(B(C_2O_4)F_2)$, and iraide salts, such as $LiN(SO_2CF_3)_2$ and $LiN(C_1F_{2l+1}SO_2)(C_mF_{2m+1}SO_2)$ {l and m are integers of 1 or more}. These lithium salts may be used alone or in combination. Among these, LdPFs is preferred In terms of ionic conductivity and electrochemical stability. The concentration of lithium salt preferably ranges from 0.8 to 1.8 moles per liter of the non-aqueous solvent.

EXPERIMENTAL EXAMPLES

Although the present disclosure will be further described in the following experimental examples, the present disclosure is not limited to these experimental examples.

Experimental Example 1

[Production of Negative-Electrode Active Material]

A Si powder (3N, 10 μm ground product), a Li2SiO3 powder (10 μm ground product), and a $ZrO_2$ powder (10 μm ground product) were mixed at a mass ratio of 42:58:1 in an inert atmosphere and were charged into a pot (made of SUS, volume: 500 mL) of a planetary ball mill (P-5 manufactured by Fritsch). The pot was charged with 24 balls made of SUS (diameter: 20 mm) and was closed. The mixed powder was ground at 200 rpm for 50 hours. The powder was then removed in an inert atmosphere and was heat-treated in an inert atmosphere at a temperature of 800° C. for 4 hours. The heat-treated powder (hereinafter referred to as base particles) was ground, was passed through a 4.0-μm mesh sieve, was mixed with coal pitch (MCP250 manufactured by JFE Chemical Corporation), and was heat-treated in an inert atmosphere at a temperature of 800° C. to be covered with carbon, thus forming an electrically conductive layer. The average particle size was adjusted to be 5 μm with a sieve. Thus, a negative-electrode active material P1 was produced.

[Analysis of Negative-Electrode Active Material]

A TEM observation of the inner structure of the negative-electrode active material P1 showed that Si particles having a size of 50 nm or less were dispersed in a Li silicate phase. A particle cross-sectional observation sample was prepared with a cross-section polisher (CP), The average particle size calculated from a backscattered electron image of $ZrO_2$ contained in a particle was determined to be 97 nm on the basis of the equivalent circle diameter calculated from the area. The Si particles and $ZrO_2$ particles were uniformly dispersed in the Li silicate phase, and the active material particles were entirely covered with carbon.

Peaks attributed to Si and $Li_2SiO_3$ were observed in an XRD pattern of the negative-electrode active material P1. No $SiO_2$ peak was observed at 2θ=25 degrees. A Si-NMR measurement, of the negative-electrode active material PI showed that the $SiO_2$ content was less than 7% by mass (below the minimum limit of detection). The $ZrO_2$ particle content can be measured by ICP emission spectrometry.

[Preparation of Negative Electrod]

The negative-electrode active material P1, a bulk graphite powder, carboxymethylcellulose (CMC), and styrene-butadiene rubber (SBR) were mixed at a mass ratio of 30:70:1:1. A proper amount of water was added to the mixture to prepare a negative-electrode mixture slurry. The negative-electrode mixture slurry was then applied to both sides of a negative-electrode current collector formed of copper foil having a thickness of 8 μm and was dried. The product was cut in a predetermined electrode size and was rolled with a roller to have a mixture density of 1.6 g/mL. Thus, a negative electrode was prepared that included a negative-electrode mixture layer on both sides of the negative-electrode current collector.

[Preparation of Positive Electrode]

A lithium nickel cobalt aluminum composite oxide represented by $LiNi_{0.88}Co_{0.09}Al_{0.03}O_2$ as a positive-electrode active material, acetylene black (AB), and poly(vinylidene fluoride) (PVdF) were mixed at a mass ratio of 100:1:1, A proper amount of N-methyl-2-pyrrolidone (NMP) was added to the mixture to prepare a positive-electrode mixture slurry. The positive-electrode mixture slurry was then applied to both sides of a positive-electrode current collector formed of aluminum foil having a thickness of 13 μm and was dried. The amount of slurry to be applied was adjusted such that the capacity ratio of the positive electrode to the negative electrode was 1:1.05. The product was cut in a predetermined electrode size and was rolled with a roller to have a positive-electrode mixture density of 3.6 g/mL. Thus, a positive electrode was prepared that included a positive-electrode mixture layer on both sides of the positive-electrode current collector.

[Preparation of Non-Aqueous Electrolytic Solution]

Ethylene carbonate (EC), dimethyl carbonate (DMC), and methyl ethyl carbonate (MEC) were mixed at a volume ratio of 20:75:5. $LiPF_6$ was dissolved in the mixed solvent at a concentration of 1.4 mol/L to prepare a non-aqueous electrolytic solution.

[Fabrication of Battery]

An aluminum lead was attached to the positive electrode, and a nickel lead was attached to the negative electrode. The positive electrode and the negative electrode were wound, with a separator interposed therebetween to form a wound electrode assembly. The separator was a polyethylene microporous membrane having a heat-resistant layer on one side. Polyamide and an alumina filler were dispersed in the heat-resistant layer. The electrode assembly was housed in a closed-end cylindrical battery case main body having an outer diameter of 18.2 mm and a height of 65 mm. The non-aqueous electrolytic solution was poured into the battery case main body. The opening of the battery case main body was then closed with a gasket and a sealant. Thus, a 18650-type cylindrical non-aqueous electrolyte secondary battery A1 having a volume energy density of 730 Wh/L was fabricated.

Experimental Example 2

A negative-electrode active material was prepared in the same manner as in Experimental Example 1 except that the mixing ratio of $Si/Li_2SiO_3/ZrO_2$ was 42/58/0.01. A battery A2 was fabricated in the same manner as in Experimental Example 1 using the negative-electrode active material.

Experimental Example 3

A negative-electrode active material was prepared in the same manner as in Experimental Example 1 except that the mixing ratio of $Si/Li_2SiO_3/ZrO_2$ was 42/53/5. A battery A3 was fabricated in the same manner as in Experimental Example 1 using the negative-electrode active material.

Experimental Example 4

A negative-electrode active material was prepared in the same manner as in Experimental Example 1 except that the mixing ratio of $Si/Li_2SiO_3/ZrO_2$ was 42/58/10. A battery A4 was fabricated in the same manner as in Experimental Example 1 using the negative-electrode active material.

Experimental Example 5

A negative-electrode active material was prepared in the same manner as in Experimental Example 1 except that the mixing ratio of $Si/Li_2SiO_3/ZrO_2$ was 42/58/15. A battery A5 was fabricated in the same manner as in Experimental Example 1 using the negative-electrode active material.

Experimental Example 6

A negative-electrode active material was prepared in the same manner as in Experimental Example 1 except that $ZrO_2$ was replaced with $Al_2O_3$. A battery A6 was fabricated in the same manner as in Experimental Example 1 using the negative-electrode active material.

Experimental Example 7

A negative-electrode active material was prepared in the same manner as in Experimental Example 1 except that $ZrO_2$ was replaced with $Al_2O_3$, and the mixing ratio of $Si/Li_2SiO_3/Al_2O_3$ was 42/53/10. A battery A7 was fabricated in the same manner as in Experimental Example 1 using the negative-electrode active material.

Experimental Example 8

A negative-electrode active material was prepared in the same manner as in Experimental Example 1 except that $ZrO_2$ was replaced with ZrC. A battery A8 was fabricated in the same manner as in Experimental Example 1 using the negative-electrode active material.

Experimental Example 9

A negative-electrode active material was prepared in the same manner as in Experimental Example 1 except that $ZrO_2$ was replaced with WC. A battery A9 was fabricated in the same manner as in Experimental Example 1 using the negative-electrode active material.

Experimental Example 10

A negative-electrode active material was prepared in the same manner as in Experimental Example 1 except that $ZrO_2$ was replaced with SiC. A battery A10 was fabricated in the same manner as in Experimental Example 1 using the negative-electrode active material.

Experimental Example 11

A negative-electrode active material was prepared in the same manner as in Experimental Example 1 except that $ZrO_2$ was not added. A battery Z1 was fabricated in the same manner as in Experimental Example 1 using the negative-electrode active material.

[Cycle Life Evaluation]

The cycle test of the batteries was performed under the following charge/discharge conditions. The number of cycles at which the discharge capacity reached 80% of the discharge capacity of the first cycle was determined as the cycle life. The cycle lives of the batteries A1 to A10 were based on the cycle life of the battery Z1 free from the metallic compound, which was taken as 100. Table 1 shows the evaluation results.

Charge/discharge conditions: Charging to 4.2 V at a constant current corresponding to 0.2 It was followed by constant voltage charging at 4.2 V to a current value corresponding to 0.02 It. Discharging was then performed at a constant current of 0.2 It to a battery voltage of 2.50 V. The charging and discharging cycle was repeated in the cycle test.

[Measurement of Expansion Coefficient]

In the battery after charging in the second cycle, the electrode assembly was removed from the battery case and was disassembled and analyzed. The thickness of the negative electrode of the disassembled electrode assembly was measured, and the expansion coefficient of the negative electrode as defined below was calculated. Table 1 shows the evaluation results.

Expansion coefficient=100×(measured thickness after charging/μm)/(theoretical thickness after charging/μm)

An increase in the expansion coefficient results from a decrease in bulk density due to the formation of a void in the negative-electrode active material particles or the formation of a surface reaction film associated with cracking of the particles. The measured thickness after charging was measured with a micrometer and was the average value of 10 points randomly selected from the negative electrode of each battery. The theoretical thickness after charging was based on the volumetric expansion coefficient of the Si particles, which was taken as 400%, and the volume expansion of the graphite particles, which was taken as 110%. An expansion coefficient closer to 1 indicates that charging is performed without the formation of a void acting as a starting point of cracks in particles.

TABLE 1

| Battery | Metallic compound | Content/ mass % | Expansion coefficient | Cycle life |
|---|---|---|---|---|
| A1 | $ZrO_2$ | 1 | 1.02 | 259 |
| A2 | $ZrO_2$ | 0.01 | 1.07 | 220 |
| A3 | $ZrO_2$ | 5 | 1.03 | 233 |
| A4 | $ZrO_2$ | 10 | 1.04 | 252 |
| A5 | $ZrO_2$ | 15 | 1.10 | 189 |
| A6 | $Al_2O_3$ | 1 | 1.03 | 240 |
| A7 | $Al_2O_3$ | 10 | 1.03 | 231 |
| A8 | ZrC | 1 | 1.05 | 210 |
| A9 | WC | 1 | 1.03 | 198 |
| A10 | SiC | 1 | 1.04 | 221 |
| Z1 | — | — | 1.14 | 100 |

Table 1 shows that the batteries of Experimental Examples 1 to 10, which contained the metallic compound, such as $ZrO_2$, in the lithium silicate matrix had a lower negative electrode expansion coefficient than the battery Z1 of Experimental Example 11 free from the metallic compound in the matrix and had longer cycle lives. The batteries A1 to A4 had particularly good cycle characteristics. This is probably because the metallic compound was more uniformly dispersed.

REFERENCE SIGNS LIST

10 negative-electrode active material particle, 11 lithium silicate phase, 12 silicon particles, 13 base particle, 14 electrically conductive layer, 15 metallic compound.

The invention claimed is:

1. A negative-electrode active material for a non-aqueous electrolyte secondary battery, comprising:
    a lithium silicate phase comprising at least one selected from $Li_2SiO_3$ and $Li_2Si_2O_5$;
    silicon particles dispersed in the lithium silicate phase; and
    a metallic compound dispersed in the lithium silicate phase (other than lithium compounds and silicon oxides), wherein a peak intensity of Si(111) is higher than a peak intensity of lithium silicate (111) in an XRD pattern obtained by XRD measurement, wherein the negative electrode active material contains no $Li_4SiO_4$.

2. The negative-electrode active material for a non-aqueous electrolyte secondary battery according to claim 1, wherein the metallic compound comprises at least one selected from zirconium oxide, aluminum oxide, zirconium carbide, tungsten carbide, and silicon carbide.

3. The negative-electrode active material for a non-aqueous electrolyte secondary battery according to claim 2, wherein the metallic compound is composed mainly of zirconium oxide.

4. The negative-electrode active material for a non-aqueous electrolyte secondary battery according to claim 1, wherein a ratio of the metallic compound to the lithium silicate phase and the silicon particles ranges from 0.01% to 10% by mass.

5. The negative-electrode active material for a non-aqueous electrolyte secondary battery according to claim 1, wherein the metallic compound has an average particle size of 200 nm or less.

6. The negative-electrode active material for a non-aqueous electrolyte secondary battery according to claim 1, wherein the silicon particles have an average particle size of 200 nm or less before initial charging.

7. The negative-electrode active material for a non-aqueous electrolyte secondry battery according to claim 1, wherein the lithium silicate phase, the silicon particles, and the metallic compound constitute a base particle, and the base particle is covered with an electrically conductive layer.

8. The negative-electrode active material for a non-aqueous electrolyte secondary battery according to claim 1, wherein the lithium silicate phase is composed mainly of $Li_2SiO_3$.

9. The negative-electrode active material for a non-aqueous electrolyte secondary battery according to claim 1, wherein the lithium silicate phase is composed mainly of $Li_2Si_2O_5$.

10. The negative-electrode active material for a non-aqueous electrolyte secondary battery according to claim 1, wherein no $SiO_2$ peak is observed at 2θ=25 degrees in an XRD pattern obtained by XRD measurement.

11. A negative electrode for a non-aqueous electrolyte secondary battery, comprising:
    a negative-electrode current collector; and
    a negative-electrode mixture layer on the negative-electrode current collector, the negative-electrode mixture layer containing the negative-electrode active material according to claim 1 and a binder.

12. A non-aqueous electrolyte secondary battery comprising: negative electrode according to claim 11;
    a positive electrode; and
    a non-aqueous electrolyte.

13. A negative-electrode active material for a non-aqueous electrolyte secondary battery, comprising:
    a lithium silicate phase represented by $Li_{2z}SiO_{(2+z)}$ {0<z<2};
    silicon particles dispersed in the lithium silicate phase; and
    a metallic compound dispersed in the lithium silicate phase (other than lithium compounds and silicon oxides),
    wherein no peak emitted by $SiO_2$ is observed in the XRD pattern obtained by XRD measurement.

14. The negative-electrode active material for a non-aqueous electrolyte secondary battery according to claim 13, wherein the metallic compound comprises at least one selected from zirconium oxide, aluminum oxide, zirconium carbide, tungsten carbide, and silicon carbide.

15. A negative-electrode active material for a non-aqueous electrolyte secondary battery, comprising:
- a lithium silicate phase represented by $Li_{2z}SiO_{(2+z)}$ {0<z<2};
- silicon particles dispersed in the lithium silicate phase; and
- a metallic compound dispersed in the lithium silicate phase (other than lithium compounds and silicon oxides),
- wherein the metallic compound comprises at least one selected from aluminum oxide, zirconium carbide, tungsten carbide and silicon carbide.

16. The negative-electrode active material for a non-aqueous electrolyte secondary battery according to claim 15, wherein the metallic compound comprises aluminum oxide.

17. The negative-electrode active material for a non-aqueous electrolyte secondary battery according to claim 15, wherein the metallic compound comprises zirconium carbide.

18. The negative-electrode active material for a non-aqueous electrolyte secondary battery according to claim 15, wherein the metallic compound comprises tungsten carbide.

19. The negative-electrode active material for a non-aqueous electrolyte secondary battery according to claim 15, wherein the metallic compound comprises silicon carbide.

* * * * *